United States Patent [19]

Eisert et al.

[11] 4,074,060
[45] Feb. 14, 1978

[54] AURAMINE SALTS

[75] Inventors: Manfred Eisert, Ludwigshafen; Karl Schmeidl, Frankenthal, both of Germany

[73] Assignee: BASF Aktiengesellschaft, Ludwigshafen, Germany

[21] Appl. No.: 646,242

[22] Filed: Jan. 2, 1976

[30] Foreign Application Priority Data

Jan. 24, 1975 Germany .............................. 2502838

[51] Int. Cl.$^2$ .................... C07C 143/12; C09D 11/02
[52] U.S. Cl. ....................................... 560/149; 106/22
[58] Field of Search .................................... 260/481 R

[56] References Cited

U.S. PATENT DOCUMENTS 2,221,377  11/1940  Harris .............................. 260/481 R

FOREIGN PATENT DOCUMENTS 1,195,424  6/1965  Germany ......................... 260/481 R
2,332,540  2/1975  Germany ......................... 260/481 R Primary Examiner—James O. Thomas, Jr.
Assistant Examiner—G. T. Breitenstein
Attorney, Agent, or Firm—Keil, Thompson & Shurtleff

[57] ABSTRACT

Auramine salts having an ester of sulfopropionic acid as anion. The salts are more stable in storage than known auramine salts and therefore very suitable for the preparation of storage-stable solutions.

4 Claims, No Drawings

AURAMINE SALTS

The invention relates to auramine salts which in one possible form correspond to the formula (I):

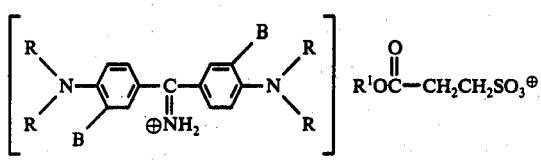

in which, independently of one another,
B is hydrogen or methyl;
R is hydrogen or $C_1$ to $C_4$ alkyl; and
$R^1$ is an aliphatic radical of one to eighteen carbon atoms, an optionally substituted cyclohexyl radical or a phenyl-$C_1$ to $C_4$-alkyl radical, with the proviso that both R's are not hydrogen on the same

group.

Examples of alkyl radicals R are methyl, ethyl, n-propyl, isopropyl, n-butyl and isobutyl. The n-alkyl radicals are preferred. Examples of radicals $R^1$ are $C_1$ to $C_4$ alkyl which may be interrupted by oxygen and may bear hydroxy, $C_1$ to $C_8$ alkanoyloxy or acetyl as a substituent or cyclohexyl bearing $C_1$ to $C_9$-alkyl as a substituent. Specifically the radical $R^1$ may be derived from the following hydroxy compounds: n-butanol, isobutanol, n-pentanol, isopentanol, n-hexanol, isohexanol, n-heptanol, isoheptanol, n-octanol, isoctanol, isononanol, isodecanol, isotridecanol, isooctadecanol, 3-methoxybutanol, hexanediol-2,5, glycol, diglycol, triglycol, propylene glycol, methyl glycol, ethyl glycol, propyl glycol, butyl glycol, ethyl diglycol, butyl diglycol, ethyl triglycol, glycol monoacetate, 4-hydroxybutanone-2, nonylcyclohexanol, benzyl alcohol or phenylethyl alcohol. The term isohexanol for example means that all possible isohexanols may be a basis for the radical $R^1$. Mixtures of the hydroxy compounds may also be used as starting substances.

Compounds of the formula (I) are particularly valuable in which
B is hydrogen or methyl;
R is hydrogen or $C_1$ to $C_4$ alkyl;
$R^1$ is $C_2$ to $C_{18}$ alkyl, cyclohexyl bearing $C_1$ to $C_9$ alkyl as a substituent, benzyl, phenylethyl, cyclohexyl, $-(CH_2CH_2O)_nR^3$ or $-(C_2H_3OCH_3)_nR^3$;
n is 1, 2 or 3; and
$R^3$ is hydrogen, $C_1$ to $C_4$ alkyl or $C_1$ to $C_8$ alkanoyl.

Particular technical importance attaches to compounds of the formula (Ia):

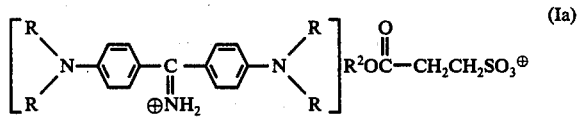

in which
R is $C_1$ To $C_4$ alkyl; and
$R^2$ is $C_5$ to $C_{14}$ alkyl or $C_2$ to $C_6$ alkyl interrupted by oxygen and optionally bearing hydroxy as a substituent.

For the production of compounds of the formula (I) an auramine base of the formula (II):

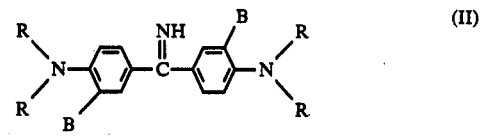

may be reacted with a sulfopropionic acid ester of the formula (III):

Compounds of the formula (III) are obtained from sulfopropionic anhydride of the formula:

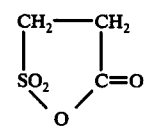

by reaction with an alcohol of the formula $R^1$—OH (see M. S. Kharasch, T. H. Chao and H. C. Brown, J. Amer. Chem. Soc. 62, 2393, 1940).

Compounds of the formula (III) are conveniently prepared by reacting sulfopropionic anhydride at a low temperature, for example within the range from $-10°$ to $+30°$ C, with the alcohol and particularly a compound containing ether groups and having the formula $R^1$—OH.

The reaction of the auramine bases with the esters of the formula (III) is conveniently carried out by introducing the base into a concentrated alcoholic solution of the sulfopropionic ester. The amount of ester should be such that a complete formation of the salt is ensured. The progress of the reaction may easily be monitored by pH measurement of samples diluted with water. Methanol, ethanol, n-propanol and isopropanol are suitable as solvents as well as the alcohols, glycols and glycol ethers already mentioned.

In some cases it may be advantageous to allow a solution of the auramine base in an organic solvent such as trichloroethylene or perchloroethylene to react with a solution of a sulfopropionic ester, for example in glycol or diglycol. The chlorohydrocarbon phase is separated after the formation of the salt is completed. Residual trichloroethylene or perchloroethylene may be easily removed from the concentrated dye solution in glycol by passing nitrogen or dry air into the same.

By reacting auramine bases with sulfopropionic esters and varying the radical $R^1$ it is possible to prepare auramine derivatives having widely different structures so that dyes having quite specific properties are obtained. The concentrated glycol solution of the dye of formula (I) with the radical $R^1$ being $CH_2$—$CH_2$—O—$CH_2$—$CH_2$—OH and the radical R being $CH_3$ may for example by diluted with water to an unlimited extent and is especially suitable for the production of aqueous dye liquors. The outstanding stability in storage of the dye concentrate is surprising and for example at 50° C it is completely devoid of deposits after thirty days, it has retained its full color strength and it yields clear solutions when diluted with water.

By contrast the solutions of auramine sulfate described in German Patent Specification No. 1,195,424 crystallize at 50° C after only a few days because of decomposition; when diluted with water a considerable proportion of the product which has been stored at elevated temperature remains undissolved.

Sulfopropionic esters having radicals $R^1$ as follows:
$CH(CH_3)$—$CH_2$—$CH_2$—$CH(CH_3)$—OH
$CH_2$—$CH_2$—OH
$CH_2$—$CH_2$—O—$CH_2$—$CH_2$—O—$CH_2$—$CH_2$—OH
$CH_3$—$CH_2$—O—$CH_3$ and
$CH_2$—$CH_2$—O—$CH_2$—$CH_3$
are very suitable for the production of water-soluble auramine dyes which are stable in storage.

The dye of the formula (I) with the radicals $R^1$ being $CH_2$—$CH(CH_2$—$CH_3)$—$CH_2$—$CH_2$—$CH_2$—$CH_3$ and R being $CH_2$—$CH_3$ does not give a useful dye liquor with water. Its very stable concentrated alcoholic solutions are rather eminently suitable for the production of printing inks having outstanding water fastness properties. In the production of, for example, floxographic printing inks only a very small amount of laking agent or none at all is required therewith.

Alcoholic solutions of dyes of the formula (I) in which $R^1$ is from $C_5H_{11}$ to $C_{14}H_{29}$ are particularly suitable for the production of printing inks.

The following Examples illustrate the invention. The parts specified therein are by weight unless otherwise stated.

EXAMPLE 1

34 parts of sulfopropionic anhydride is introduced while cooling into 75 parts of ethyl glycol; the whole is then stirred overnight at ambient temperature.

63 parts of ethylauramine base is added to 86 parts of the solution thus obtained and stirred for 1 hour at 50° C. A concentrated dye solution ($R^1$ being $CH_2$—$CH_2$—O—$CH_2$—$CH_3$ and R being $CH_2$—$CH_3$). It is outstandingly suitable for the production of aqueous dye liquor.

EXAMPLE 2

68 parts of sulfopropionic anhydride is introduced while cooling into 125 parts of diethylene glycol. The whole is stirred overnight at room temperature and then 170 parts of this solution is allowed to flow into a filtered solution of 133 parts of auramine base in 880 parts of trichloroethylene. 65 parts of glycol is added and stirring is continued for another hour. The trichloroethylene phase is then separated. The glycol solution of dye is washed with 200 parts of trichloroethylene and then freed from chlorohydrocarbon residues by passing in nitrogen. 335 1 parts of a concentrated dye solution ($R^1$ being $CH_2$—$CH_2$—O—$CH_2$—$CH_2$—OH and R being $CH_3$) is obtained; it may be used for the production of aqueous dye liquor.

EXAMPLE 3

68 parts of sulfopropionic anhydride is introduced while cooling into 125 parts of gylcol. The whole is stirred overnight at ambient temperature and then 167 parts of this acid solution is dripped into a solution of 139 parts of ethylauramine base in 960 parts of perchloroethylene. The perchloroethylene phase is then separated and the solution of dye in glycol is washed with 160 parts of perchloroethylene. Remainders of chlorohydrocarbon are removed by passing in nitrogen. 304 parts of a concentrated dye solution ($R^1$ being $CH_2$—$CH_2$—OH and R being $CH_2$—$CH_3$) is obtained; it is suitable for the production of aqueous dye liquor.

EXAMPLE 4

100 parts of a mixture (1:1) of ethanol and ethyl glycol is added to an acid solution which has been prepared from 68 parts of sulfopropionic anhydride and 78 parts of 2-ethylhexanol-1. 100 parts of auramine base is then added and dissolved at 50° C. A dye concentrate is obtained ($R^1$ being $CH_2$—$CH(CH_2$—$CH_3)$—$CH_2$—$CH_2$—$CH_2$—$CH_3$ and R being $CH_3$). It is suitable for the production of flexographic printing inks.

EXAMPLE 5

60 parts of a mixture (1:1) of ethanol and ethyl glycol and 99 parts of ethylauramine base are added to 76.5 parts of an acid solution which has been prepared from 68 parts of sulfopropionic anhydride and 53 parts of pentanol 1. The whole is then stirred for 1 hour at 50° C. A concentrated dye solution ($R^1$ being $CH_2$—$CH_2$—$CH_2$—$CH_2$—$CH_3$ and R being $CH_2$—$CH_3$) is obtained which is suitable for the production of flexographic printing ink.

The following auramine compounds are also obtained by methods analogous to those in Examples 1 to 5:

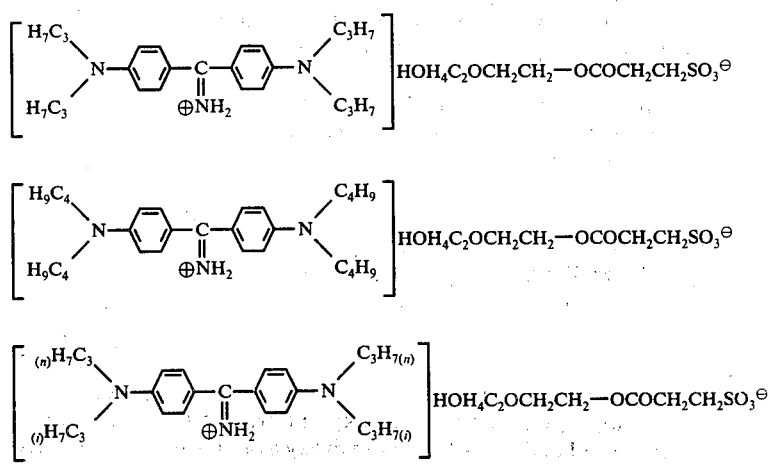

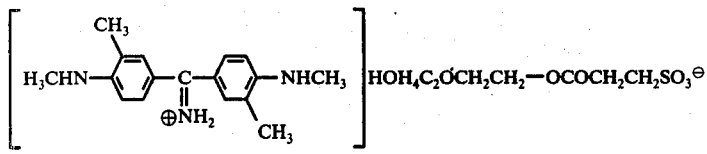

Very valuable products are similarly obtained when the following anions are used for the dyes in the above Examples:

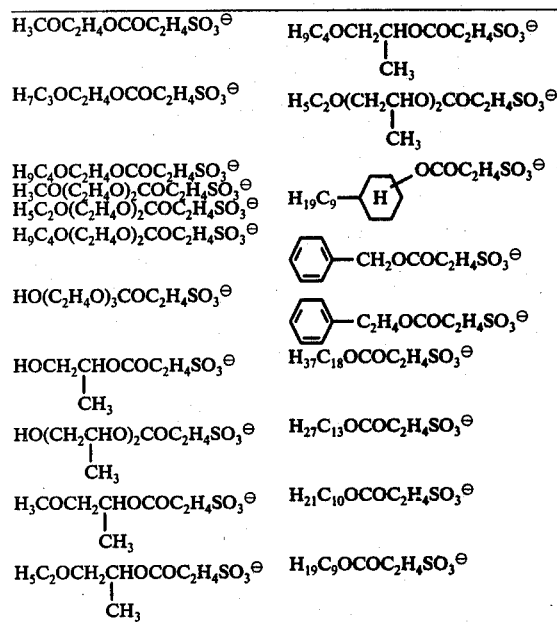

We claim:
1. A water soluble compound of the formula

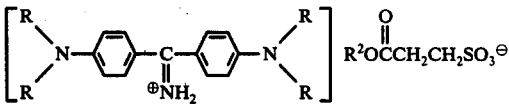

in which
R is $C_1$—to $C_4$-alkyl,
$R^2$ is —$(CH_2CH_2O)_nR^4$ or $$(-CH\underset{\underset{CH_3}{|}}{}CH_2-O-)_nR^4,$$

$n$ is 1, 2 or 3 and
$R^4$ is hydrogen or $C_1$— to $C_4$-alkyl.
2. A compound according to the formula in claim 1, wherein $R^4$ is $C_1$- to $C_4$-alkyl.
3. A compound according to the formula in claim 1, wherein $n$ is 2 or 3.
4. A compound according to the formula in claim 1, wherein $R^2$ is —$CH_2CH_2OCH_2CH_2OH$.

* * * * *